Feb. 22, 1949.         A. G. OMAR         2,462,666
ARTICULATED RAILWAY VEHICLE
Filed April 12, 1946                    5 Sheets-Sheet 1
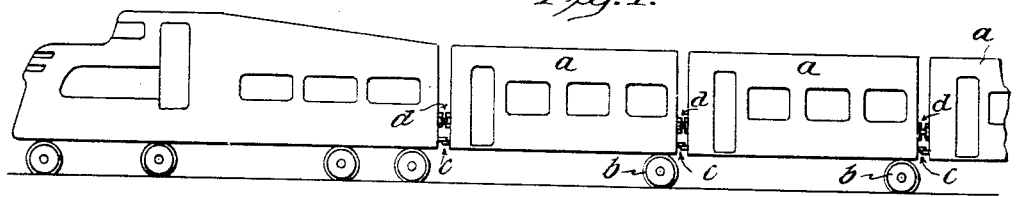
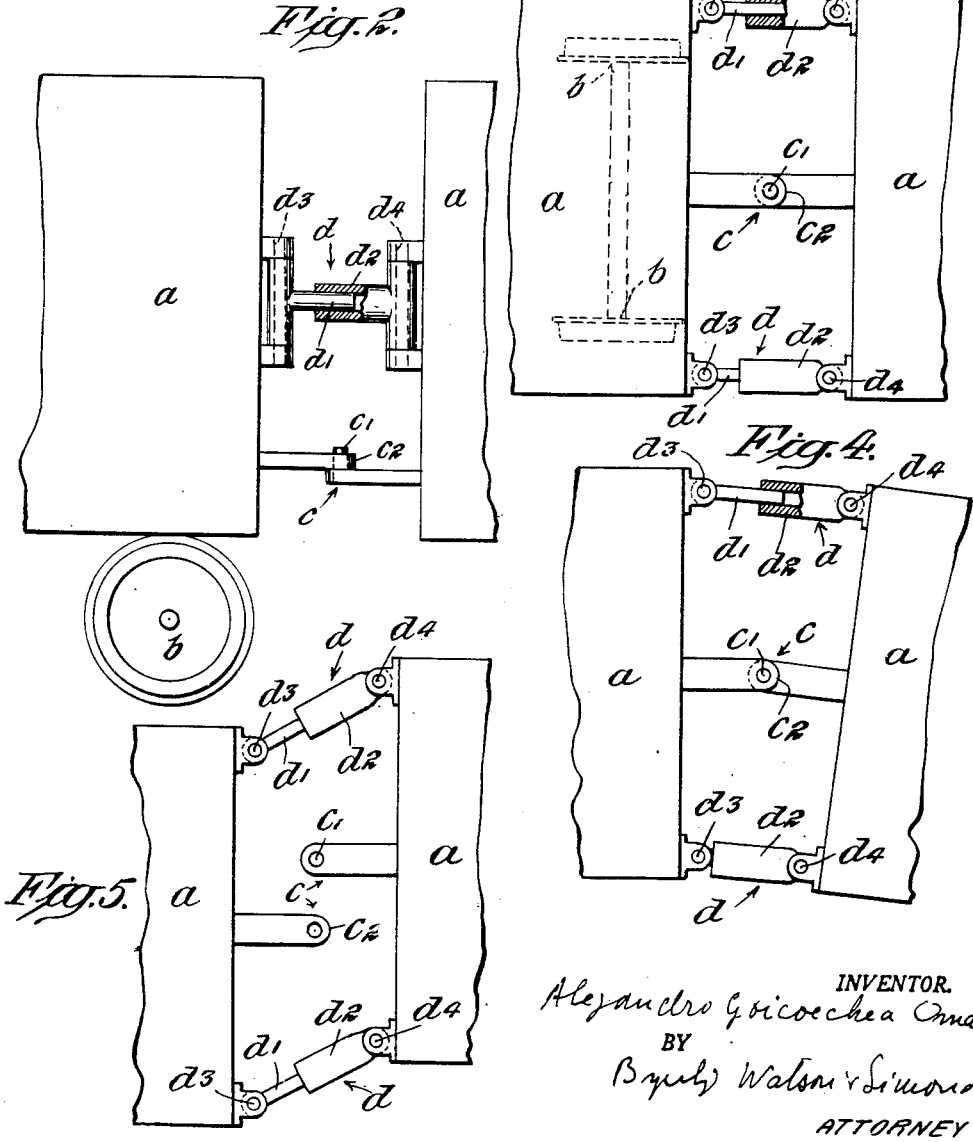

Feb. 22, 1949.　　　　　A. G. OMAR　　　　　2,462,666
ARTICULATED RAILWAY VEHICLE
Filed April 12, 1946　　　　　　　　　　　　　5 Sheets-Sheet 2

INVENTOR.
Alejandro Goicoechea Omar
BY
Byerly, Watson & Simonds
ATTORNEY

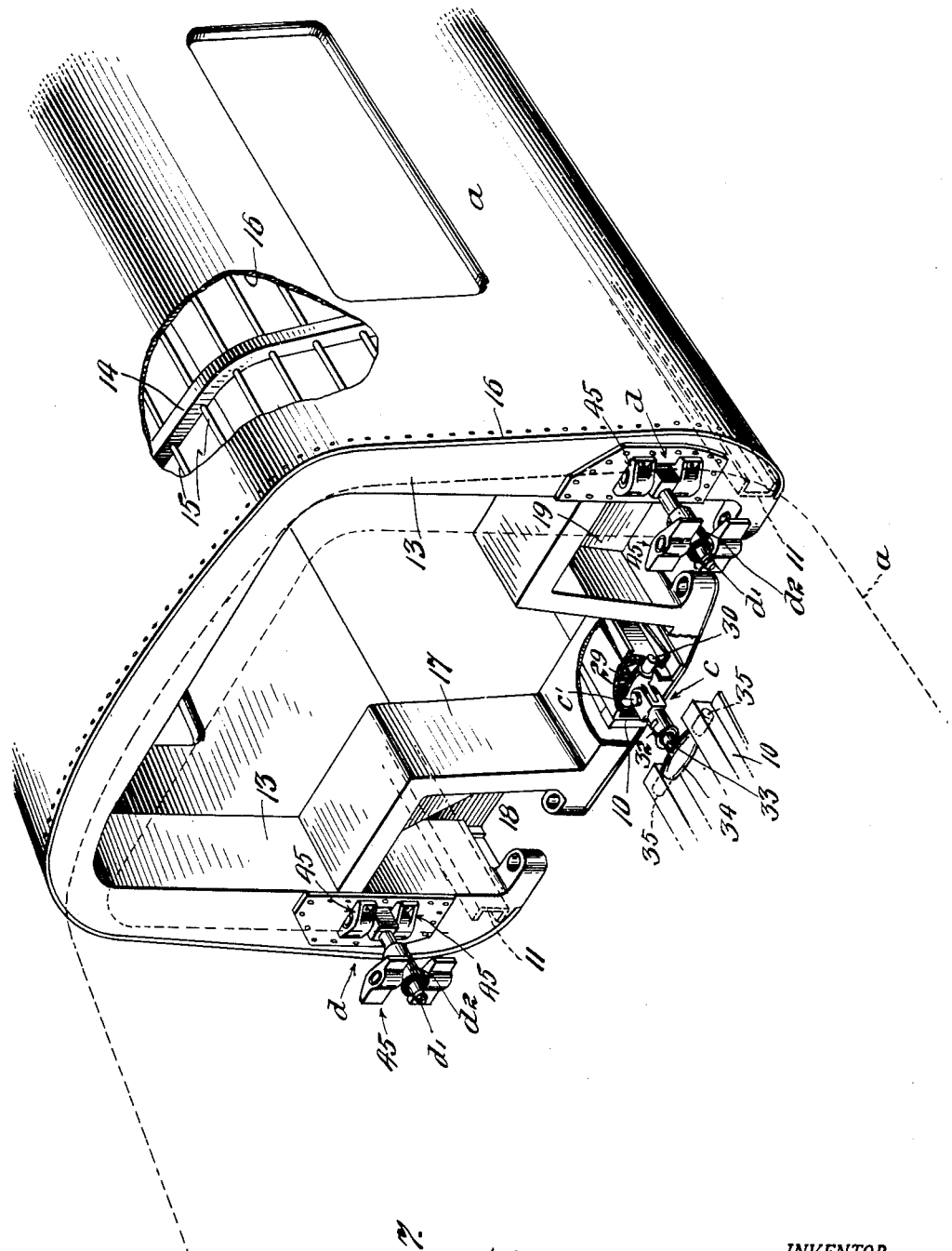

Feb. 22, 1949.  A. G. OMAR  2,462,666
ARTICULATED RAILWAY VEHICLE
Filed April 12, 1946  5 Sheets-Sheet 4
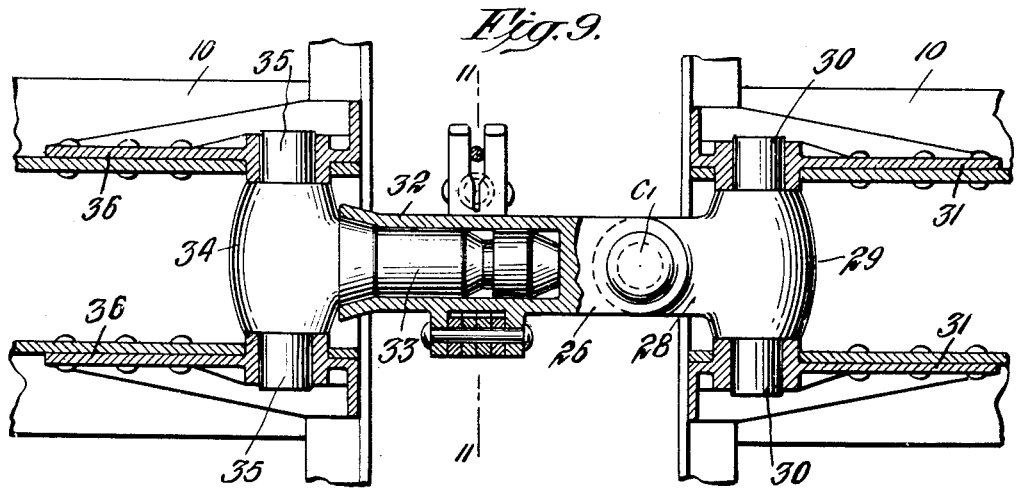
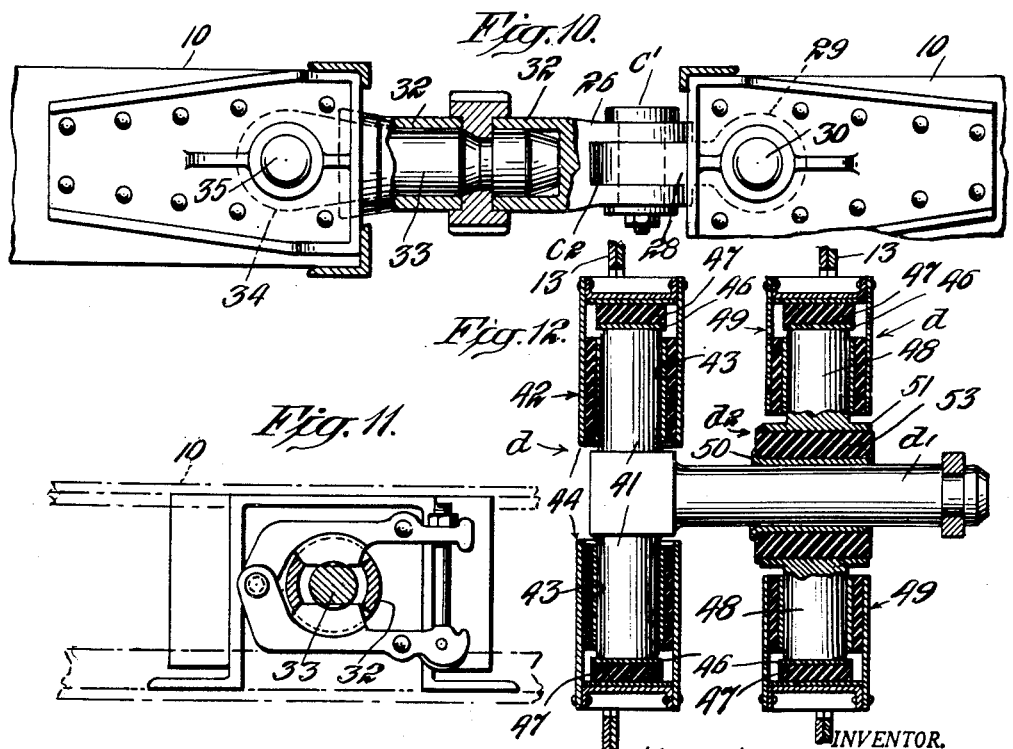

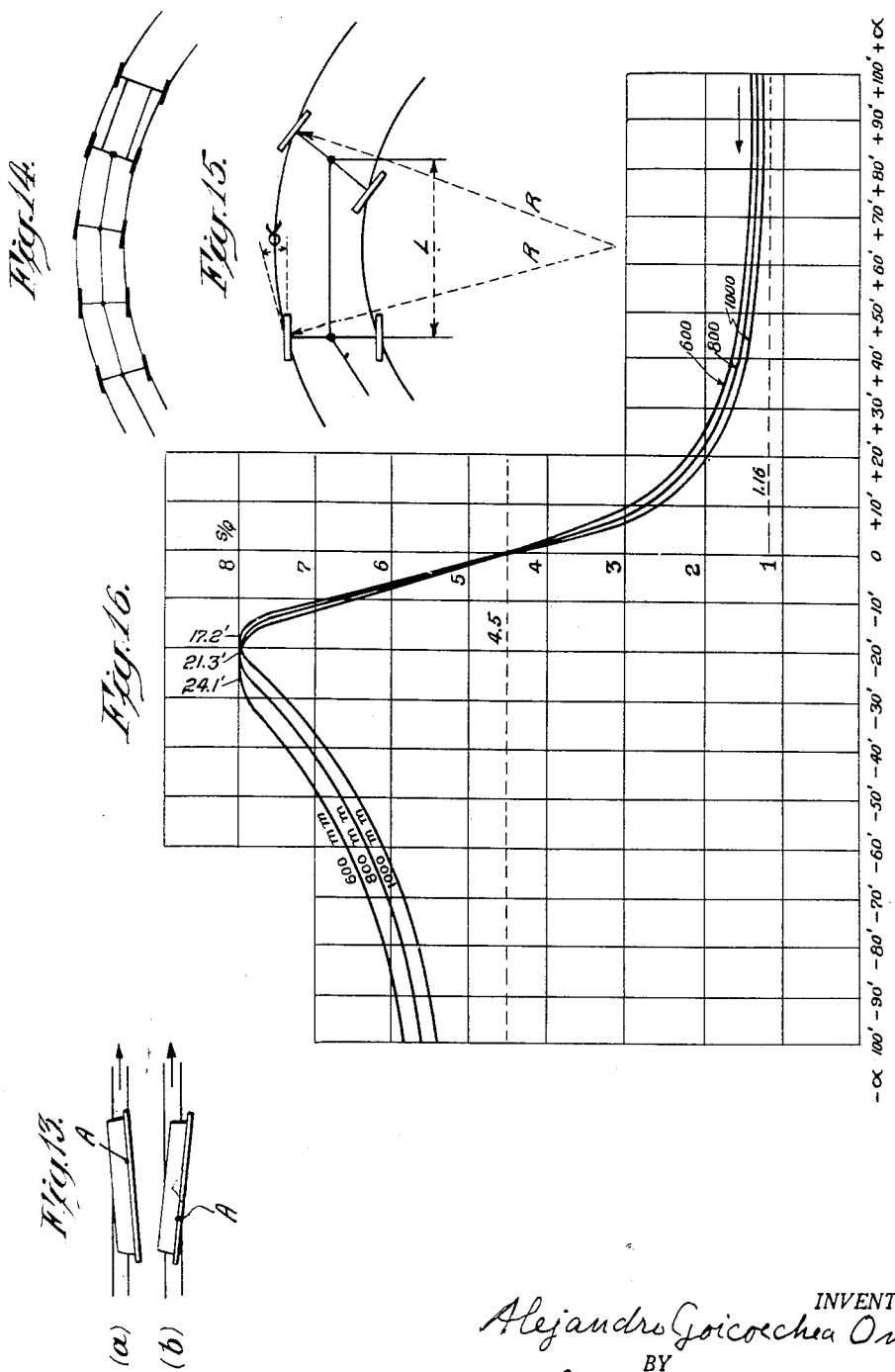

Patented Feb. 22, 1949

2,462,666

UNITED STATES PATENT OFFICE 2,462,666

ARTICULATED RAILWAY VEHICLE

Alejandro Goicoechea Omar, Madrid, Spain, assignor to Patentes Talgo, S. A., Madrid, Spain Application April 12, 1946, Serial No. 661,699
In Spain September 30, 1943

Section 1, Public Law 690, August 8, 1946
Patent expires September 30, 1963

19 Claims. (Cl. 105—4)

1

This invention relates to an articulated railway vehicle. The new vehicle when coupled to a tractor, which may be of ordinary construction, provides a light railway train which may be economically and safely operated at high speed without danger of derailment.

In ordinary railway vehicle construction, a long rigid car body is mounted at its ends on four-wheel bogies which are pivoted to the body and therefore unguided. The front outer wheel of each bogie attacks the track at a curve at a positive angle bringing the leading edge of its flange into contact with the rail so that the friction between its flange and the track tends to cause the wheel to mount the track. This tendency is counteracted by the weight of the vehicle. By guiding the wheels, it is posible to make the outer wheel attack the track at a curve at a negative angle of incidence bringing the trailing edge of its flange into contact with the rail so that the friction between its flange and the rail tends to hold the wheel on the rail. When the wheels are thus guided it is unecessary to rely on the weight of the vehicle to prevent derailment at curves.

Guiding of the wheels to attack the track at a negative angle on curves may be obtained in a train of cars each of which has only one pair of wheels. The wheels of each car are located at its rear end with their axis held perpendicular to the axis of the car. The front end of each car is pivoted to the rear end of the preceding car near its wheel axis. The wheels are then guided so as to attack the track on curves at a small negative angle provided that the length of each vehicle bears the right relation to the radius of the curves in the track. This relation, which can be worked out mathematically as hereinafter explained, is such that the vehicles must be very much shorter than those now customarily used on railroads. This introduces a serious difficulty in making practical use of guided wheels in railway train construction, since, regardless of the spring suspension that may be used, very short railway cars are subject to pitching motions which are uncomfortable for passengers, and which also may introduce dangerous strains on the structural parts. Furthermore, the use of short independent cars involves a serious hazard in the case of collision, since endwise shocks on a train of such cars are likely to throw the ends of the cars sideways or upward into positions in which the cars are ill adapted to resist the force of the collision.

By the present invention, I have obviated these difficulties by providing a single long railway vehicle consisting of articulated sections. The sections are integrated by connecting means at their ends which restrain any relative movement of translation between adjacent section ends in any direction, and also restrain any relative rotation or tipping of the ends of adjacent sections, so that the entire vehicle rides as a single vehicle notwithstanding the fact that the connections between the sections permit turning of the sections in a horizontal plane so that the vehicle may follow curves in the track. The integration of the sections into a single vehicle with the ends of adjacent sections always in alignment is also an important safety factor in the case of collision.

In order to make clear the nature of the invention and its various advantages, I will describe in detail articulated vehicles embodying my invention and illustrated in the accompanying drawings in which:

Figs. 1–5 are partially diagrammatic views showing an articulated vehicle embodying the invention in a simple form:

Fig. 1 is a side view of the articulated vehicle coupled to a locomotive;

Fig. 2 is a side view of the adjacent ends of two adjacent sections showing a connecting means between them;

Fig. 3 is a plan view of the connection shown in Fig. 2;

Fig. 4 is a view similar to Fig. 3 showing the position of the connecting means when the vehicle is on a curve in the track, the sharpness of the curve being exaggerated for the sake of clearness; and Fig. 5 is an illustrative view showing what would be the effect of releasing the traction connection.

Figs. 6–12 show the construction of a vehicle embodying the invention in the form which I consider most desirable:

Fig. 6 is a side view of the vehicle coupled to a locomotive;

Fig. 7 is a perspective view of the rear end of one of the sections showing the connecting means;

Fig. 8 is a rear end view of one of the sections;

Figs. 9, 10 and 11 are detail views of the traction connection, Fig. 9 being a partially sectioned plan view, Fig. 10 a partially sectioned elevation, and Fig. 11 a section on the line 11—11 of Fig. 9; and Fig. 12 is an enlarged vertical section of one of the lateral connecting means.

Figs. 13–16 are diagrams explaining the operation of an articulated vehicle embodying the invention:

Fig. 13 is a diagram showing the action of a wheel at an angle to the track indicating at (a)

a positive angle of attack, and at (b) a negative angle of attack;

Fig. 14 is a diagrammatic plan view of the vehicle and the locomotive on a curved track whose curvature is exaggerated;

Fig. 15 is a diagram showing two adjacent pairs of wheels of the vehicle on a curved track whose curvature is still further exaggerated; and Fig. 16 is a graph indicating the relation between the angle of attack and the factor of safety against derailment.

The articulated vehicle shown in Fig. 1 consists of a number of rigid sections $a$ each supported by a pair of wheels $b$ at its rear end. The connection between the adjacent ends of each two adjacent sections includes a central connection $c$, and two lateral connections $d$. The latter are located near the outer sides of the sections so that they are at least as far apart as the rails of the track.

The central connection $c$ restrains separating movements of the section ends and is thus a traction connection. It also restrains relative sideways movement of the section ends. Most desirably, it is formed to permit free relative vertical movement so that it bears no part of the weight of either section. It includes a vertical pivot $c_1$ mounted on one of the sections and engaging a close-fitting bearing $c_2$ mounted on the other section, so as to permit turning of the sections in a horizontal plane.

The lateral connections $d$ restrain relative vertical movement of the parts which they connect. As they are located at the sides of the vehicle, they serve to restrain not only relative vertical movements of the section ends but also relative rotation of the section ends about the axis of the vehicle, that is, relative tipping of the sections. The lateral connections $d$ permit relative horizontal movement about the central pivot $c_1$ such as occurs when the vehicle enters a curved track. The connections $d$ are essentially sliding connections, each consisting of a slide element $d_1$ and a guide element $d_2$ in which the slide fits without play. In order to permit a close fit without danger of jamming when the vehicle is on a curved track, the slide element $d_1$ is pivotally connected to one of the sections to turn about a vertical axis $d_3$ and the guide element $d_2$ is pivoted to the other section so as to turn about a vertical axis $d_4$. Because of this pivoting it will be seen that the lateral connections $d$ cannot in themselves prevent relative lateral movement of the section ends (see Fig. 5), but, since such movement is prevented by the central traction connection, the central and lateral connections cooperate to keep the section ends always in perfect alignment.

The front end of the front section is pivotably connected to the rear end of the tractor and supported by the tractor, for example, by means of central and lateral connections similar to those used between the sections.

Figure 8:
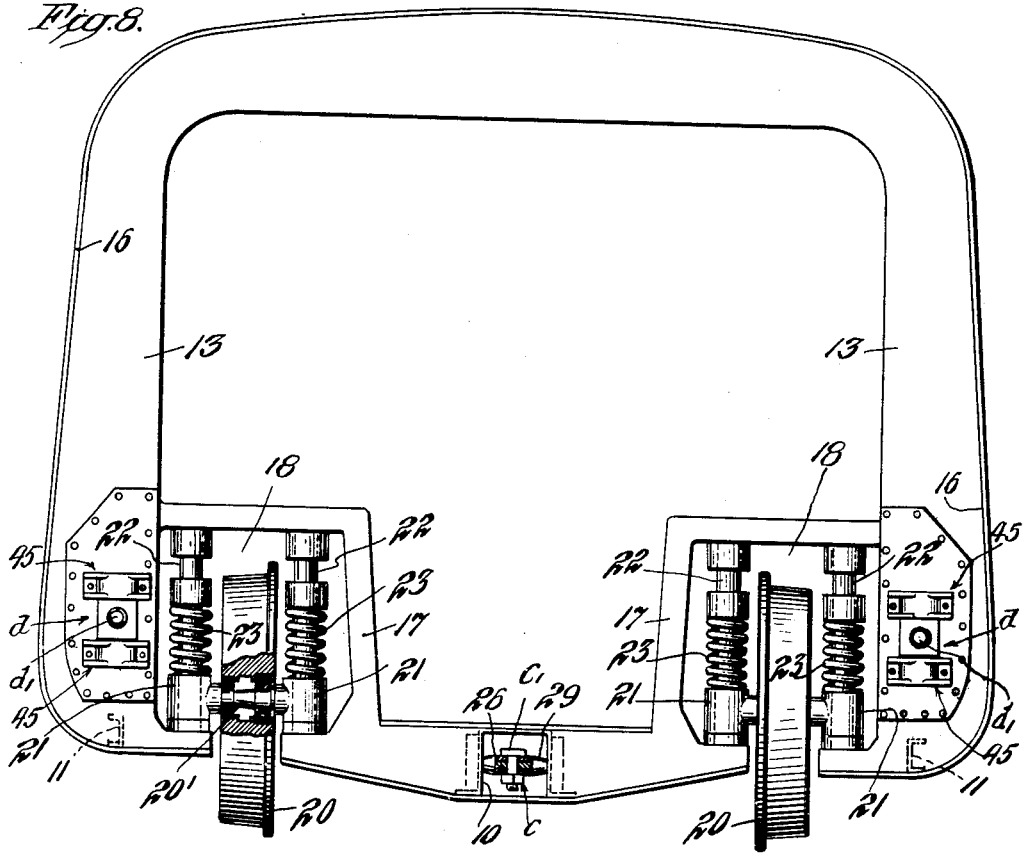
Figure 6:
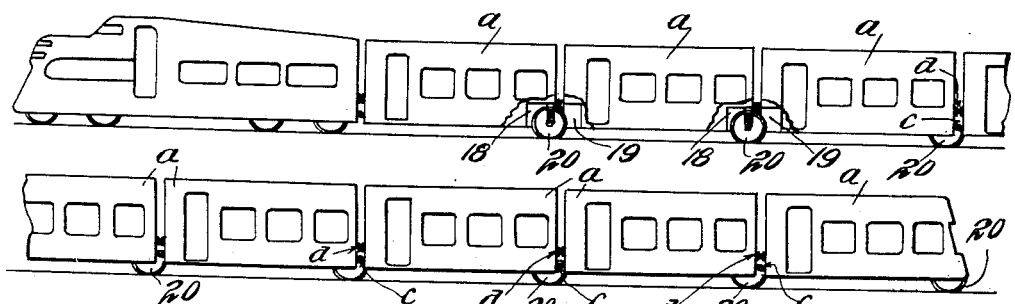

Figs. 6–12 show the construction of the articulated vehicle which I consider most desirable.

Each section $a$ is a rigid tubular body. The floor of each section is made up of a central sill 10, two side sills 11 and transverse sills in more or less conventional fashion. The walls and roof consist of two strong transverse end frames 13, several light intermediate frames 14, with stringers 15 and a thin sheet covering 16 fixed rigidly in place by rivets or spot welding.

To each end frame 13 is attached a composite beam 17 extending transversely across the end of the section and having a lowered middle portion embracing the center sill 10 and leaving a space at the level of the floor sufficient for the comfortable passage of the passengers. This beam has the same width as the end frame 13 which is about one-half the diameter of a wheel. The elevated end portions of each beam 17 contain boxes 18, 19 in which the wheels are accommodated.

The wheels 20 of the vehicle are mounted in pairs at the rear ends of the sections. Each wheel is journalled independently of the other wheel of the same pair on a shaft $20'$ connecting two slides 21 mounted on vertical guide rods 22 fixed in one of the boxes 18. Spring suspension is provided by coil springs 23. The mounting of each wheel prevents any turning of its axis and any forward or backward movement of its axis with respect to the section to which it is connected. The mounting thus maintains the common axis of the two wheels of each pair of wheels perpendicular to the axis of the section preceding it.

The guide rods 22 are mounted at the open end of one of the boxes 18 so that the upper part of each wheel lies partly within the box 18 at the rear end of the section on which it is mounted and partly within the box 19 at the front end of the adjacent section. This arrangement makes the wheel bearings and spring suspension accessible for inspection or repair when the sections are to be separated. It also has the advantage of placing the common axis of the wheels of each section directly at the rear end of the section, so that the pivots $c_1$ of the traction connections between the sections may easily be placed substantially in the same vertical planes as the wheel axes.

The traction connection $c$ between section ends includes a vertical pivot $c_1$ secured in a yoke 26, and a close-fitting bearing $c_2$ entering the yoke and surrounding the pin. The bearing is formed in a flange 28 extending from a sleeve 29 mounted on a horizontal pin 30 whose ends are held in two bearing plates 31 attached to the center sill 10 of one section. There is no play between the ends of the sleeve 29 and the bearing plates 31.

The yoke 26 carrying the pivot $c_1$ is carried by a sleeve 32 which is detachably secured on a pin 33 carried by a sleeve 34 mounted on a horizontal bearing pin 35 whose ends are held by bearing plates 36 attached to the center sill 10 of the other section. No play is allowed between the ends of the sleeve 34 and these bearing plates.

The horizontal pivot pins 30, 35 constitute two closely-spaced horizontal axes in the coupling connection so that the coupling connection permits relative up and down movements between the section ends and therefore carries no part of the weight of the section to whose front end it is attached. On the other hand, on account of the engagement between the ends of the sleeves 29, 34 with the bearing plates 31, 36, the traction coupling effectively prevents any relative horizontal movement of the section ends, except horizontal turning about the pivot $c_1$.

The lateral connections $d$ are secured to the end frames 13 of the sections. They are located near the outer sides of the section and at a considerable distance above the traction connection, preferably as high as the center of gravity of the sections.

The slide $d_1$ of each lateral connection $d$ consists of a pin which is secured to a vertical pivot 41 mounted in a vertical bearing 42 attached to the end frame 13 of one of the sections. The vertical bearing 42 includes a metal bearing sleeve 43 fitting closely on the pivot 41 and an outer sleeve 44 held in brackets 45 mounted on the end frame 13. Between the bearing sleeve and the outer sleeve is a cylindrical rubber cushion which is most desirably bonded to both of the sleeves. Both upward and downward movements of the vertical pivot 41 are prevented by end bearings 46 secured in the outer sleeve 45. The end bearings may also contain rubber cushions 47.

The guide or bearing $d_2$ of the connection is attached to a vertical pivot 48 which is carried by a vertical bearing 49 constructed like the vertical bearing for the pivot 41 and mounted on the end frame 13 of the other section. The guide $d_2$ is composed of an inner metal bearing sleeve 50 and an outer sleeve 51, and a rubber cushion 53 between the sleeves and most desirably bonded to both of them.

The connecting means which have been described operate as previously explained in connection with Figs. 1–5. In addition, the traction connection permits relative turning of adjacent sections about a horizontal axis, and the rubber cushions in the lateral connections also permit such turning to a slight extent. This has the advantage of providing articulation of the sections in a vertical plane to permit the vehicle to accommodate itself to vertical curves in the track such as may occur at the top of a hill or the bottom of a valley or at the entrance to a banked curve. The relative angular movements of the sections required for these purposes are so extremely small that the use of the rubber cushions is not essential to the operation of the vehicle, but the rubber cushions are desirable to prevent the passage of vibrations from one section to the next.

The operation of the articulated vehicle will be described in connection with the diagrams, Figs. 13–16. This will explain why it is possible to use the extremely light construction indicated in the drawings without danger of derailment.

The terms "positive" and "negative" angle of attack are used to define a relation between a flanged wheel and a track when the rolling direction of the wheel is not exactly parallel to the track. When the rolling direction of the wheel is inclined toward the track from the side of the track engaged by the flange on the wheel, as shown at (a) in Fig. 13, the wheel is said to attack the track at a positive angle. When the rolling direction of the wheel is inclined away from the track toward the side of the track which is engaged by the flange on the wheel, as shown at (b) in Fig. 13, the wheel is said to attack the track at a negative angle. The nature of the angles of attack of the wheels of an articulated vehicle embodying the invention is indicated in Figs. 14 and 15.

Fig. 14 is a plan view of the vehicle and an attached locomotive on a curved track. Each section is represented by two perpendicular lines, one of which represents its axis and the other the axis of its wheels. The front end of the axis of each section is held by its pivot to the median line of the track, since the traction pivot at the front end of each section is substantially in the horizontal plane of the wheel axis of the preceding section.

It is apparent from Fig. 14 that the outer wheel of each section will attack the track at a negative angle so that the rear part of its flange will come in contact with the inner face of the rail, while the front outer wheel of a four-wheel bogie, or of the locomotive shown in Fig. 14, attacks the track at a positive angle so that the front part of its flange is in contact with the inner face of the rail. (See Fig. 13 in which the contact points between the flanges and the rails are indicated at A). Friction between the front portion of the wheel flange and the rail tends to make the wheel mount the rail, while friction between the rear portion of the flange and the rail tends to hold the wheel on the rail. It is evident, therefore, that there is less danger of derailment when the wheel attacks the track at a negative angle.

In textbooks dealing with railroading, danger of derailment is considered in connection with the Nadal safety factor $S/Q$. This factor represents the ratio of side thrust that a wheel can stand to weight bearing on the wheel. The greater this factor, the less the danger of derailment.

Fig. 16 shows three curves in which the safety factor $S/Q$ is plotted as a function of the angle of attack for each of three wheel diameters, namely, 600, 800 and 1,000 mm. These curves show that the safety factor is much larger for negative than for positive values of the angle of attack and indicate also that the maximum value of the safety factor where danger of derailment is least occurs at an angle of attack of about $-20'$.

In an articulated vehicle embodying the invention, the angle of attack $a$ depends upon the length L of a section of the vehicle and the radius of curvature R of the track. It is apparent from Fig. 15 that the relation between these quantities is $L/2R = \sin \alpha$. Consequently, in order to give $a$ the value of $-20'$, the length of each section must be equal to about .012 of the radius of curvature of the track. For existing railroads, this gives a section length of between three and six times the gauge of the track.

This application is a continuation-in-part of my co-pending applications Serial No. 571,436, filed January 5, 1945, and Serial No. 632,436, filed December 3, 1945, and contains subject matter heretofore presented in my application Serial No. 762,451, filed July 21, 1947. These three co-pending applications have been abandoned in favor of this application.

What I claim is:

1. An articulated railway vehicle consisting of a plurality of pairs of wheels, a plurality of rigid sections each having its rear end mounted on one pair of wheels and each having a length of between three and six times the gauge of the pairs of wheels, and integrating connections between the sections formed to positively hold adjacent ends of adjacent sections in alignment while permitting free relative turning of the sections in a horizontal plane.

2. An articulated railway vehicle comprising a plurality of pairs of wheels, a plurality of rigid sections each having its rear end mounted on one pair of wheels, and connecting means integrating the sections and each consisting of a central traction connection including a vertical pivot and formed to permit relative horizontal turning movement about said pivot and to prevent other relative horizontal movement of the parts which it connects and lateral connections formed to permit relative horizontal movement and to substantially prevent relative vertical movement of the parts which they connect.

3. An articulated railway vehicle comprising a plurality of pairs of wheels, a plurality of rigid sections each having its rear end mounted on one pair of wheels, and connecting means integrating the sections and each consisting of a central traction connection including a vertical pivot and formed to permit relative horizontal turning movement about said pivot and to prevent other relative horizontal movement of the parts which it connects and lateral connections formed to permit relative horizontal movement and to substantially prevent relative vertical movement of the parts which they connect, the traction connections being formed to permit relative vertical movement of the section ends which they connect so that they bear no part of the weight of either section.

4. An articulated railway vehicle comprising a plurality of pairs of wheels, a plurality of rigid sections each having its rear end mounted on one pair of wheels, and connecting means for the adjacent ends of adjacent sections consisting of a central traction connection including a vertical pivot connected to one section end and a close-fitting bearing connected to the other section end, and lateral connections each consisting of a horizontal slide pivotably mounted on one section end to turn about a vertical axis, and a close-fitting guide for said slide pivotably mounted on the other section end to turn about a vertical axis.

5. A railway vehicle as claimed in claim 4 in which the traction connections are formed to permit relative vertical movement of the section ends which they connect so that they bear no part of the weight of either section.

6. A railway vehicle as claimed in claim 4 in which the lateral connections are located above the plane of the traction connections and substantially in the plane of the centers of gravity of the sections.

7. An articulated railway vehicle comprising a plurality of pairs of wheels, a plurality of rigid sections each having its rear end mounted on one pair of wheels, and connecting means integrating the sections and each consisting of a central traction connection permitting relative turning about vertical and horizontal axes and lateral connections substantially preventing relative rolling movement of the sections which they connect and sufficiently yieldable to permit a slight relative turning of said parts about a horizontal axis.

8. In an articulated railway vehicle consisting of a plurality of rigid sections, an aligning connection between the adjacent ends of adjacent sections comprising a central traction connection including a vertical pivot, and two lateral connections each consisting of a slide, a close-fitting guide for said slide, means mounting the slide on the end of one section, and means mounting the guide on the end of the adjacent section, both said mounting means including slightly yieldable resilient material such as rubber.

9. An aligning connection for the sections of an articulated vehicle, comprising vertical bearings mounted on adjacent section ends and each including inner and outer sleeves and a rubber cushion between the sleeves, a vertical pin turnably mounted in the inner sleeve of each bearing, means for preventing longitudinal movement of the pin in the bearing in either direction, a slide extending laterally from one of said vertical pins, and a guide engaging the slide and extending laterally from the other of said vertical pins.

10. An aligning connection for the sections of an articulated railway vehicle, comprising a metal slide, a composite guide for said slide consisting of an inner metal sleeve fitting closely on said slide, an outer metal sleeve, a sleeve of rubber between said sleeves, a vertical pivot attached to the slide, a vertical pivot attached to the outer sleeve of the composite guide, and vertical bearings for said pivots secured to adjacent ends.

11. A railway vehicle comprising an articulated body consisting of a plurality of rigid sections and integrating connections between the sections formed to positively hold adjacent ends of adjacent sections in alignment while permitting free relative turning of the sections in a horizontal plane, pairs of wheels located near the articulation points of the body, spring suspensions mounting the body on said pairs of wheels, and means fixing the axis of each pair of wheels with respect to the body section in advance of it.

12. A railway vehicle comprising an articulated body consisting of rigid sections and connecting means integrating the sections and each consisting of a central traction connection including a vertical pivot, and lateral connections formed to permit relative horizontal movement about said pivot and to substantially prevent relative rolling movement of the sections which they connect, pairs of wheels located near the vertical pivots of the body, spring suspensions mounting the body as a unit on said pairs of wheels, and means fixing the axis of each pair of wheels with respect to the body section in advance of it.

13. An articulated railway vehicle comprising rigid body sections, central pivotal connections between the ends of the sections, pairs of wheels located near the pivotal connections, spring suspensions supporting the rear end of each section on one pair of wheels, and two springless weight-bearing connections separated by a distance at least as great as the distance between the wheels and supporting two widely spaced points of the front end of each section on two equally spaced points of the spring suspended end of the preceding section, so that the adjacent ends of each two sections ride together on one of the spring suspensions.

14. In an articulated railway vehicle, the combination with a body consisting of separate sections each having a pair of wheels and a spring suspension at one end only, of connecting means between the spring suspended end of one section and the unsupported end of the adjacent section integrating the sections and each consisting of a central traction connection including a vertical pivot, and lateral connections formed to permit relative turning of adjacent sections about said pivot and to substantially prevent relative rolling movement of adjacent sections, so that the entire vehicle body rides as a unit on the spring suspensions.

15. In an articulated railway vehicle, the combination claimed in claim 14 in which the lateral connections are capable of slight yielding.

16. In a railway train, a plurality of cars each having a body and a pair of wheels at its rear end only and connecting means for the cars, each comprising a pivotal traction connection on the axis of the vehicle which takes all longitudinal forces between the cars, and longitudinal telescopic connections at the sides of the vehicle which permit longitudinal movement and positively limit up and down movement.

17. In a railway train, a plurality of cars each having a body and a pair of supporting wheels at the rear end only, complementary draft coupling members at the adjacent ends of the bodies, and separable two part connections between the ends of adjacent bodies whereby the weight of the front end of one car is supported by the wheel mounted rear end of the preceding car, said separable connections being connected with the car bodies at points separated a distance at least equal to the distance between the wheels of each pair, the connections being arranged in a horizontal plane a substantial distance above the coupling members and forming therewith three connections in triangular arrangement constituting an interlock between adjacent ends of the cars.

18. In a railway train, a plurality of cars each having a body and a pair of supporting wheels at the rear end only, complementary draft coupling members at the adjacent ends of the car bodies, pin and socket members slidably interengaged in a horizontal direction, means mounting two of the pin members for movement about vertical axes at opposite sides of one end of one car body, and means mounting the two related socket members for movement about vertical axes at opposite sides of the adjacent end of a contiguous car body.

19. A train as claimed in claim 18 wherein yieldable shock absorbing means is provided between the pin and socket members and the related mounting means.

ALEJANDRO GOICOECHEA OMAR.

REFERENCES CITED

The following references are of record in the file of this patent:

UNITED STATES PATENTS

| Number | Name | Date |
|---|---|---|
| 267,335 | Driggs | Nov. 14, 1882 |
| 1,480,635 | Putnam | Jan. 15, 1924 |
| 2,087,377 | Geissen | July 20, 1937 |
| 2,115,095 | Bugatti | Apr. 26, 1938 |
| 2,373,348 | Schroeder et al. | Apr. 10, 1945 |

Certificate of Correction

Patent No. 2,462,666.  February 22, 1949.

ALEJANDRO GOICOECHEA OMAR

It is hereby certified that errors appear in the printed specification of the above numbered patent requiring correction as follows:

Column 1, line 4, for the syllable and hyphen "econ-" read *eco-*; column 8, line 5, after the word "adjacent" insert *section*;

and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*